UNITED STATES PATENT OFFICE.

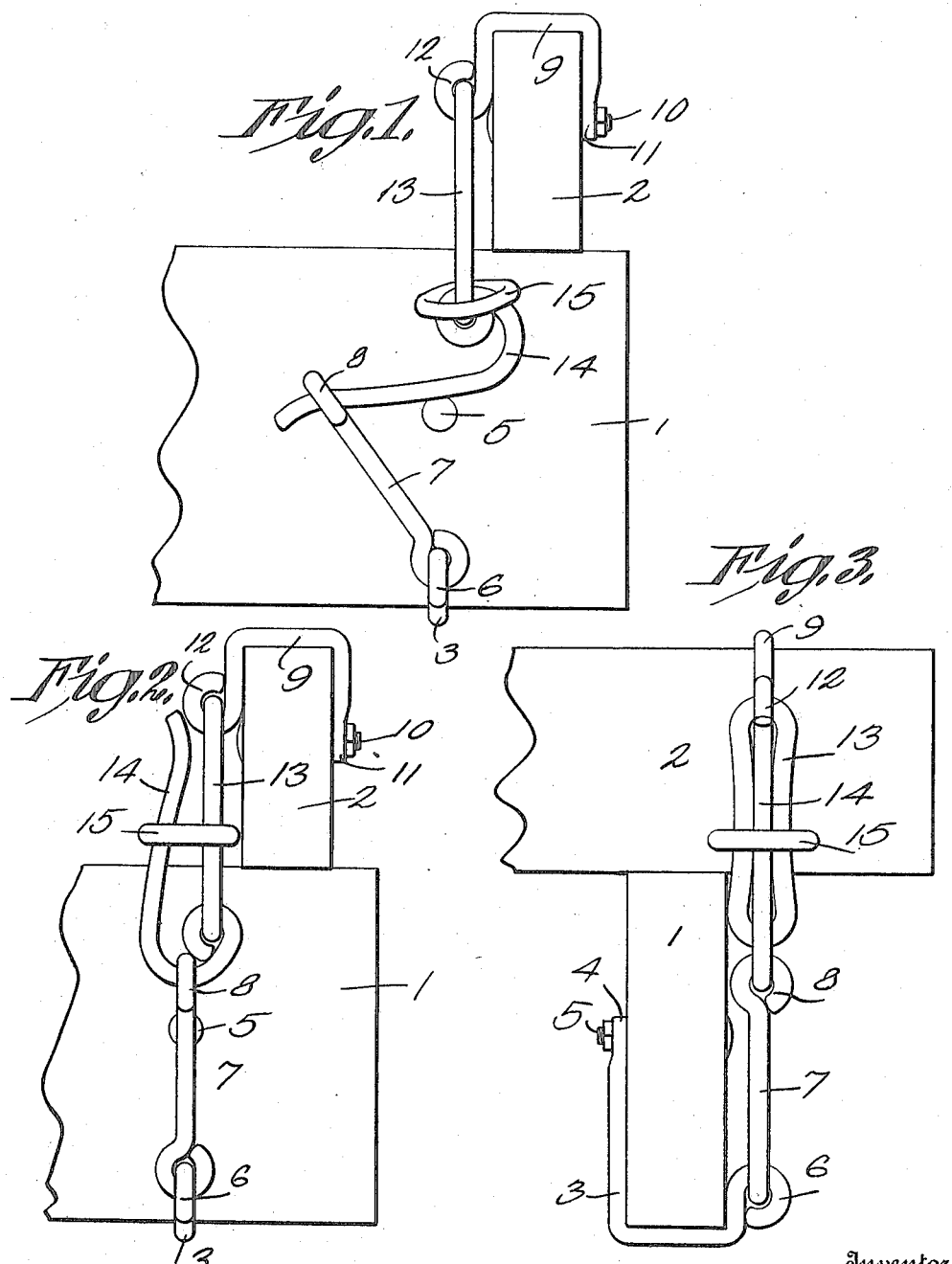

JOHN BLUE, OF OROSI, CALIFORNIA.

DETACHABLE HAY-RACK.

1,257,575.

Specification of Letters Patent.

Patented Feb. 26, 1918.

Application filed April 14, 1917. Serial No. 162,116.

*To all whom it may concern:*

Be it known that I, JOHN BLUE, a citizen of the United States, residing at Orosi, in the county of Tulare and State of California, have invented a new and useful Detachable Hay-Rack, of which the following is a specification.

The subject of this invention is a detachable hay rack in which interlocking clamping members coöperate to detachably secure portions of the rack together.

The principal object of the invention is to provide clamps at the juncture of sections of the rack, which may be operated to quickly attach or detach the parts.

Another object is to provide a clamp which may be operated to join cross sills or other adjoining sections of a structure.

Another object is to provide a locking lever linked to one section of the structure and a link on an adjoining section and engaged by the lever to detachably secure the parts together.

Still another object is to provide a clamp for securing parts of a structure together, of simple, efficient, and cheap construction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

One practical embodiment of the invention is shown in the accompanying drawings, wherein:—

Figure 1 is a side elevation of the device showing the locking lever partly detached.

Fig. 2 is a side elevation showing the lever in locked position.

Fig. 3 is a front elevation of the device, showing the lever in locked position.

Referring to the drawings by numerals:—

The numeral 1 indicates one longitudinal sill or supporting beam of a hay rack, upon which is mounted one of the cross beams 2, which extend laterally beyond the wagon bed and form supports for the flooring of the rack.

An L-shaped bar 3 has the free end 4 of its leg flattened and apertured to receive a bolt 5 by which the arm is secured to the sill 1. The free end of the arm of L-shaped rod 5 is upturned and bent to form an eye 6. This L-shaped rod 3 straddles the sill 1, as seen most clearly in Fig. 3. A connecting link 7 is pivotally secured to the eye 6 and has its free end bent to form an eye 8.

A U-shaped bar 9 straddles the cross beam 2 and is secured thereto by a bolt 10, which passes through an aperture formed in the flattened end 11 of one leg of the bar 9. The free end of the other leg of the bar 9 is bent to form an eye 12 in which is pivotally secured an open link 13. Pivotally secured to the lower or free end of the link 13 is a locking lever 14, the free end of which is adapted to the eye 8, and which may be secured in locked position by a loop or ring 15 which surrounds, and is slidable on the link 13.

The device is used as follows:—The cross beam 2 is placed in position on the sill 1, and the end of the locking lever inserted in the eye 8 of connecting link 7 and drawn up to locking position. The loop 15, which had been slid up link 13, is then brought down over the lever 14, locking the same securely in place and securing the parts together.

Having described my invention, what I claim as new and desire to secure by Letters Patent, is:—

The combination with a longitudinal sill and a transverse beam thereon, of an L-shaped bar adapted to straddle the lower edge of the sill, the free end of the leg of the L-shaped bar having an aperture for the reception of means for fastening the bar to the sill, a link pivotally secured to the other end of the bar, a U-shaped bar adapted to straddle the beam and having an aperture at one end for the reception of means for fastening the bar to the beam, a link pivotally secured to the other end of the U-shaped bar, and detachable means for securing the links together to bind the beam upon the sill.

In testimony that I claim the foregoing as my own, I have hereto affixed my signature in the presence of two witnesses.

JOHN BLUE.

Witnesses:
J. E. HARPER,
J. E. GREENE.

Copies of this patent may be obtained for five cents each, by addressing the "Commissioner of Patents, Washington, D. C."